(12) United States Patent
Shea et al.

(10) Patent No.: US 9,968,081 B2
(45) Date of Patent: May 15, 2018

(54) HUNTING DECOY APPARATUS FOR LURING WILD GAME

(71) Applicants: Darrel J. Shea, Mullberry, FL (US); Melissa Mia Kain, Lakeland, FL (US)

(72) Inventors: Darrel J. Shea, Mullberry, FL (US); Melissa Mia Kain, Lakeland, FL (US)

( * ) Notice: Subject to any disclaimer, the term of this patent is extended or adjusted under 35 U.S.C. 154(b) by 0 days. days.

(21) Appl. No.: 15/708,278

(22) Filed: Sep. 19, 2017

(65) Prior Publication Data
US 2018/0000065 A1    Jan. 4, 2018

Related U.S. Application Data

(62) Division of application No. 14/963,457, filed on Dec. 9, 2015.

(51) Int. Cl.
*A01M 31/06* (2006.01)

(52) U.S. Cl.
CPC ......... *A01M 31/06* (2013.01); *A01M 2200/00* (2013.01)

(58) Field of Classification Search
CPC .................................................. A01M 31/06
USPC .................................................. 43/2, 3, 131
See application file for complete search history.

(56) References Cited

U.S. PATENT DOCUMENTS

| | | | | |
|---|---|---|---|---|
| 1,302,160 A | * | 4/1919 | Hedrich | ........................... 43/131 |
| 1,579,512 A | * | 4/1926 | Bushong | ............. A01M 25/004 43/131 |
| 4,172,335 A | * | 10/1979 | Farmer | ................. A01M 31/06 43/3 |
| 6,408,558 B1 | * | 6/2002 | Cornell, Jr. | ........... A01M 31/06 43/2 |
| 6,574,902 B1 | * | 6/2003 | Conger | ................. A01M 31/06 43/2 |
| 6,901,694 B1 | * | 6/2005 | Neault | ................. A01M 1/2011 43/131 |
| 8,893,425 B2 | * | 11/2014 | Tanner | .................. A01M 31/06 43/2 |
| 2009/0094877 A1 | * | 4/2009 | Smith | .................... A01M 31/06 43/3 |
| 2010/0077648 A1 | * | 4/2010 | Tucker, Jr. | ............. A01M 31/06 43/3 |

(Continued)

*Primary Examiner* — Darren W Ark
(74) *Attorney, Agent, or Firm* — Robert C. Kain, Jr.

(57) ABSTRACT

A hunting decoy apparatus, wherein the decoy exhibits lifelike movements controlled mechanically by a user. The apparatus comprises an outer sleeve member and a movable slidable member slidably engaged within the outer sleeve member. The outer sleeve member attaches to the ground. The decoy stand is inserted into the movable sliding member and extends perpendicular from the outer sleeve member in an upward direction with a decoy on top. The distal ends of the slidable inner sleeve member and the outer sleeve member are connected by an extension limiting biasing element such as a spring or elastic cord. A tether is attachable to the proximal end of the movable slidable member. To activate movement of the decoy, the tether is pulled and released by the user causing the decoy and decoy stand to move within the slot forward and backwards. Small tugs on the tether by the user causes the decoy to move in lifelike movements creating the appearance the decoy is bobbing and pecking like a wild bird.

4 Claims, 4 Drawing Sheets

(56) References Cited

U.S. PATENT DOCUMENTS

2012/0198752 A1\* 8/2012 Steinhausen .......... A01M 31/06
  43/2
2012/0266775 A1\* 10/2012 Buchta .................. A01M 31/06
  104/134
2017/0164604 A1\* 6/2017 Shea ..................... A01M 31/06

\* cited by examiner

HUNTING DECOY APPARATUS FOR LURING WILD GAME

This is divisional patent application based upon and claiming the benefit of Ser. No. 14/963,457, filed Dec. 9, 2015, the contents of which is incorporated herein by reference thereto. This is a regular patent application titled Hunting Decoy Apparatus for Luring Wild Game.

The present invention relates to a hunting decoy apparatus, namely a decoy, which exhibits lifelike movements controlled mechanically by a hunter.

BACKGROUND OF THE INVENTION

Hunting decoys are used to lure wild game toward a hunter. Decoys are typically stationary and secured to the ground with stakes. Decoys are often elaborately painted to depict the desired animal. Some decoys are made to move, in an effort to create a more lifelike decoy. Some of these moving decoys use elaborate electronics and robotics, often involving a remote control. However, elaborate electronics and robotics create sounds which deter the wild game from approaching the decoy, and in fact repel the wild game.

For example, some elaborate decoys contain motors controlled by remote control units to achieve the bobbing and pecking of the decoy. The RC servos that are used to provide actuation for the various mechanical systems are audible, even noisy. Some moving decoys also include electronic winders to make the decoy turn. However, wild birds, such as turkeys, have exceptional hearing and eye sight which makes these noisy decoys unable to successfully attract wild game. Additionally, some decoys include a small antenna. The wild turkey can see the antenna and become leery of the decoy as opposed to attracted to it.

Some non-battery decoys utilize two lines to mechanically turn the decoy back and forth. In such a case, the hunter is too occupied with operating the decoy movement to be able to take a shot at the wild game. Accordingly, a simple, silent, and effective moving decoy is desired. It is also desired to provide a decoy that has lifelike to and fro movements that include pecking and bobbing, whereby movement is silently and easily created by a user.

OBJECTS OF THE INVENTION

It is an object of the present invention to provide a hunting apparatus for luring wild game wherein the decoy has lifelike movements provided by way of simple mechanical means which are silent. The means of movement overcome the noisy electronic and robotic movements contained in prior moving decoys.

It is a further object of the present invention to provide a decoy that has lifelike backwards and forwards movements that include pecking and bobbing, whereby movement is silently and easily created by a user.

SUMMARY OF THE INVENTION

The present hunting decoy apparatus is simple, silent, and effective. The hunting decoy apparatus with lifelike movements comprises an outer sleeve member and a movable slidable member slidably engaged within the outer sleeve member. The outer sleeve member which remains stationary, has a slot in the top surface. There is a circular void through the upper surface of the movable slidable member into which the decoy stand is inserted and attached. The decoy stand extends perpendicularly from the outer sleeve member and the movable slidable member in an upward direction. The stationary out sleeve is coupled or further attached to the inner sleeve by a biasing element, such as a spring or elastic or other spring-like element (e.g., a flexible bar element) which permits the movable inner sleeve to return to a "rest position" after being pulled to an alternate position. A decoy of an animal is attachable to an end of the decoy stand. A tether is attachable to the proximal end of the movable slidable member. To activate movement of the decoy, the tether is pulled and released by the user causing the movable slidable member to slide in and out from within the outer sleeve. When the tether is pulled, the spring or elastic cord (the bias element) is stretched allowing the inner sleeve member to slide forward. When tension on the tether is released by the user, the spring or elastic band or cord retracts the inner sleeve member aftward while the outer sleeve member remains stationary. This causes the decoy and decoy stand, which are attached to the movable slidable member, to rock and wobble within the slot forward and backwards. Small tugs on the tether by the user causes the decoy to move in lifelike movements creating the appearance the decoy is bobbing or pecking like a wild bird.

In an alternate embodiment, the hunting decoy apparatus has lifelike movements and comprises an outer member that allows the decoy to make arcuate movements. A decoy of an animal is attachable to an end of the decoy stand. A biasing member is connected at its distal end to the inside rearward wall of the outer member and connected on the proximal end to the decoy stand or an engagement point on the slidable member. An upper track slot is in the top surface of the outer member receives the decoy stand, wherein the upper track slot contains an arcuate track slot segment. A lower track segment is on the internal bottom side of the outer member and contains an arcuate tract segment. Interior rails may be used for the arcuate track. The decoy stand rests on the bottom interior surface of the outer member, is guided by the lower track segment, and extends perpendicularly from the outer member in an upward direction. A tether is attachable to the decoy stand (or a tether attachment point on the slidable member) and extending out of the proximal face of the outer member toward a user. To activate movement of the decoy, the tether is pulled and released by the user causing the decoy stand to move within the upper track slot and lower track segment forward and backwards. When the tether is pulled, the spring or elastic cord (the bias element) is stretched allowing the inner sleeve member to slide forward. When tension on the tether is released by the user, the spring or elastic band or cord retracts the inner sleeve member aftward while the outer sleeve member remains stationary. Small tugs on the tether by the user causes the decoy to move in lifelike movements creating the appearance the decoy is bobbing and pecking like a wild bird.

DETAILED DESCRIPTION OF THE PREFERRED EMBODIMENTS

Figure 1:
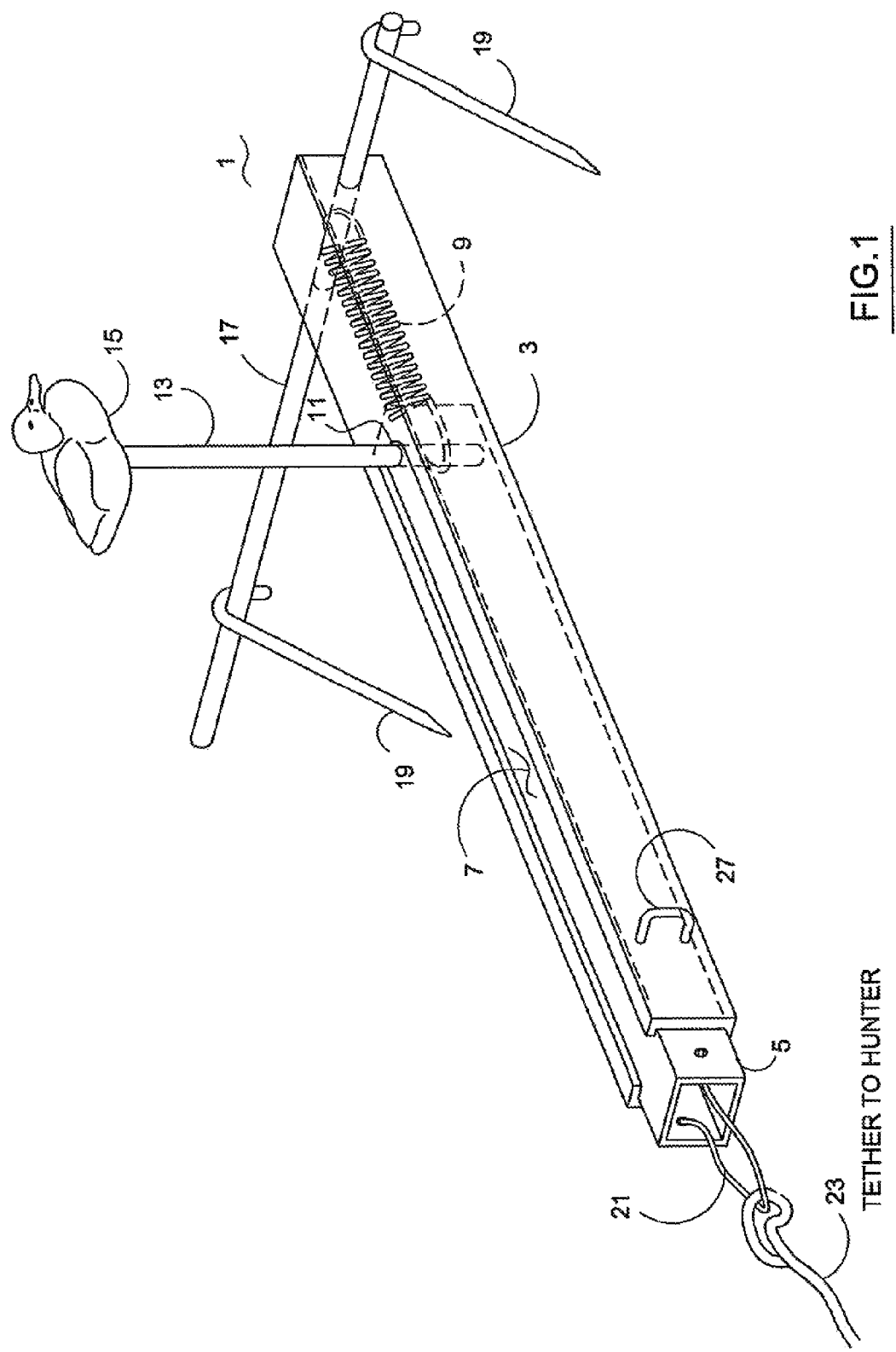
FIG. 1 is a perspective view of the hunting decoy apparatus.

FIG. 1 is a perspective view of the hunting decoy apparatus. The base of the hunting decoy apparatus 1 is composed of an outer sleeve member 3. The outer sleeve member 3 is shown as a rectangular shape, but may be square, round, oval, or semi-circular. Slidably engaged within the outer sleeve member 3 is movable slidable member 5. The movable slidable member 5 may also be any shape, including rectangular, square, round, oval, or semi-circular, as long as it fits within the outer sleeve member 3. Decoy 15 is attached to a decoy stand 13. The stand 13 is generally perpendicular to the top surface of the outer sleeve member 3. The outer sleeve member 3 includes a slot 7 running about ¾ of the length of the outer sleeve member 3. The decoy stand 13 is set within the slot 7 and is inserted into a circular void 25 through the upper surface of the movable slidable member 5. The decoy stand 13 extends through the movable sliding member 5 and the proximal end of the extension and retraction element 9, and rests on the interior bottom surface of the movable sliding member 5.

The hunting decoy apparatus 1 is secured to the ground by appropriate means. In one embodiment, a cross bar 17 extends perpendicularly through the distal end of the outer sleeve member 3. The cross bar 17 allows for stakes 19 to be attached by one end to the cross bar 17 and the other end of the stake 19 to be driven into the ground. The stakes 19 stabilize the hunting decoy apparatus 1 to the ground. This secures the hunting decoy apparatus 1 from moving position when the decoy 15 movement is activated. Intermediate loops 27 on the outer sleeve member 3 can also serve to prevent the hunting decoy apparatus 1 from moving when the decoy 15 movement is activated by acting as an attachment means for stakes 19. Likewise, other ground or tree attachments may be used to tie off the distal end of the hunting decoy apparatus 1 to a tree or bush. These attachment means would be best in rocky, hard ground locations as well as wet or very soft dirt areas where stakes are not apt to remain securely in place.

As further shown in FIG. 1, spring 9 biases the movable slidable member 5 forward (towards the distal end of the apparatus) within the outer sleeve member 3. The spring 9 is attached at its distal end to the cross bar 17 (or attached to a distal point on the outer sleeve 3) and at its proximal end to the decoy stand 13. The spring 9 can be any known biasing element, such as a coiled spring, elastic band, air cylinder or any known element that limits expansion and compression. Stop 11 is at the terminal, distal end of slot 7 in the outer sleeve member 3. Stop 11 limits the aftward movement of the decoy stand 13.

Figure 2:
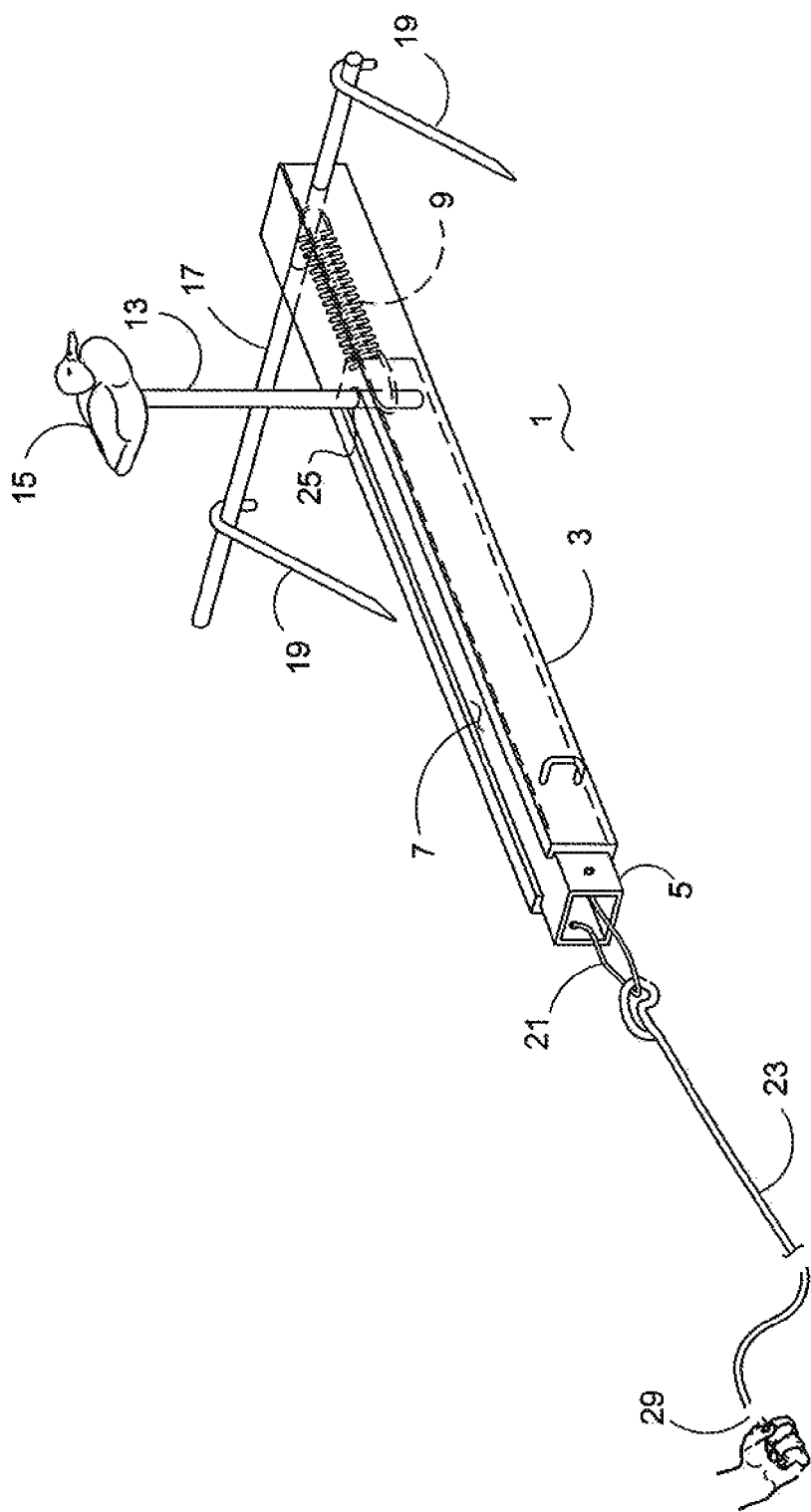
FIG. 2 is a perspective view of the hunting decoy apparatus showing the tether retracted.
Figure 3:
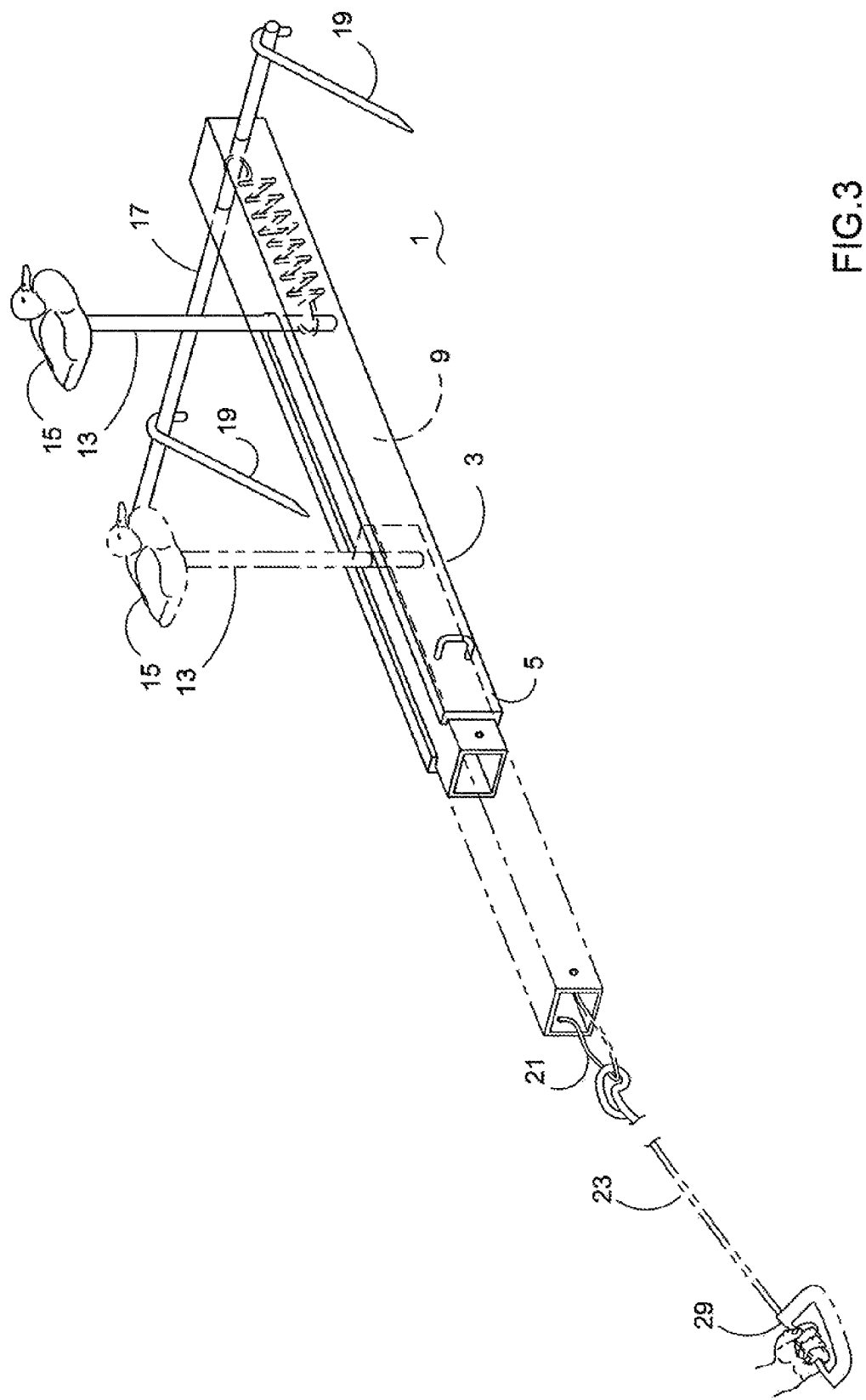
FIG. 3 shows the extended movement of the decoy on the apparatus.

Attachment means 21 is on the proximal facing end of the movable sliding member 5. Attachment means 21 may be a bale, cotter pin, hook, cross rod, rope, loop, or any attachment means that are attachable to holes in the side of the moveable slidable member 5. A tether 23 attaches to the attachment means 21. As shown in FIGS. 2 and 3, the tether 23 allows the user of the hunting decoy apparatus 1 to activate the motion of the decoy 15. The user pulls the tether 23 which causes the movable sliding member 5 to slide out of outer sleeve member 3. Slide member 5 moves distally forward due to the user, and proximally backward due to the bias force on the spring. The decoy stand 13 is seated in the distal end of the moveable sliding member 5 and, when the tether 23 is pulled, the decoy stand 13 and decoy 15 are moved with the movable sliding member 5 toward the user and sprung back by the spring. The decoy stand 13 is not aptly secured within circular void 25 through the upper surface of the movable slidable member 5 and the decoy 15 size may be substantial. Therefore, there is a bit of play or movement that causes the decoy stand 13 to sway fore and aft with light pulls of the tether 23 from the user. This sway or wobble is also enhanced by the user releasing the tether 23, causing the spring 9 to draw the decoy stand back into its original position within the outer sleeve member 3. This slight tugging motion causes the decoy 15 to appear to have lifelike movements. This sway or wobble can cause the decoy 15 to appear to be bobbing and pecking as birds do.

As shown in FIG. 2, the tether 23 may include a handle 29 or loop on the proximal end that is held by the user. The tether 23 can be any known material that can serve to pull, such as cord, string, rope, or fishing line. The user may use his hands to pull the tether 23 by holding on to handle or loop 29. The user may also loop the tether 23 around the toe of his shoe or boot and activate the motion of the decoy 13 by flexing his ankle. When a user uses his foot to control the movement of the decoy, it allows both of the user's hands to be free to hold his gun or rifle.

The hunting decoy apparatus and its constitute parts can be made of a variety of sturdy materials, such as metal, wood, plastic (pvc, polyethylene, etc.) or a combination thereof. Ideally, the hunting decoy apparatus is weatherproof or weather durable and is able to withstand a variety of weather conditions. In the preferred embodiment, the length of the outer sleeve member 3 is approximately 20-28 inches and the length of the movable slidable member 5 is approximately 14-22 inches in length. In one embodiment, the length of the outer sleeve member 3 is 24 inches and the length of the movable slidable member is 18 inches.

The decoy 15 is removable from the decoy stand 13. This will prevent damage to the decoy 15 in transport and storage. This also provides for a hunting decoy apparatus 1 that is compact and easily carried to the desired hunting location. This also allows the user to interchange a variety of decoys 15 with one apparatus 1. Any attachment means may be used to attach the decoy 15 to the stand 13. For example, the attachment means could be an inverted cone inside the decoy 15 body which allows a swage fit to decoy stand 13 rods of various diameters, or alternatively, a simple inverted cup receptacle in the decoy 15 body. Once the hunting decoy assembly 1 is completely assembled, the user can attempt to conceal the apparatus and tether 23 with native leaves and brush. This would be in addition to any camouflage design on the outside of the apparatus 1 itself.

The hunter's position does not necessarily have to be linear relative to the hunting decoy apparatus 1, as the tether 23 may first pass around a stationary point which is in line with it, or be threaded thru an attached pulley, or even a stake or a pin or wicket, so long as any turning point of the tether 23 does not offer resistance beyond the retrieval strength of the spring 9.

The decoy 15 may be a simple impaled decoy (of cloth, rubber, plastic or urethane foam) as opposed to hard plastic or the like. When the tether 23 is pulled, the decoy 15 may be made to bob forward and back as though pecking. The decoy 15 may even rotate in an uncontrollable direction as birds do. These motions are effectively deceptive to wild game birds causing them to gather in the vicinity of the decoy 15.

Figure 4:
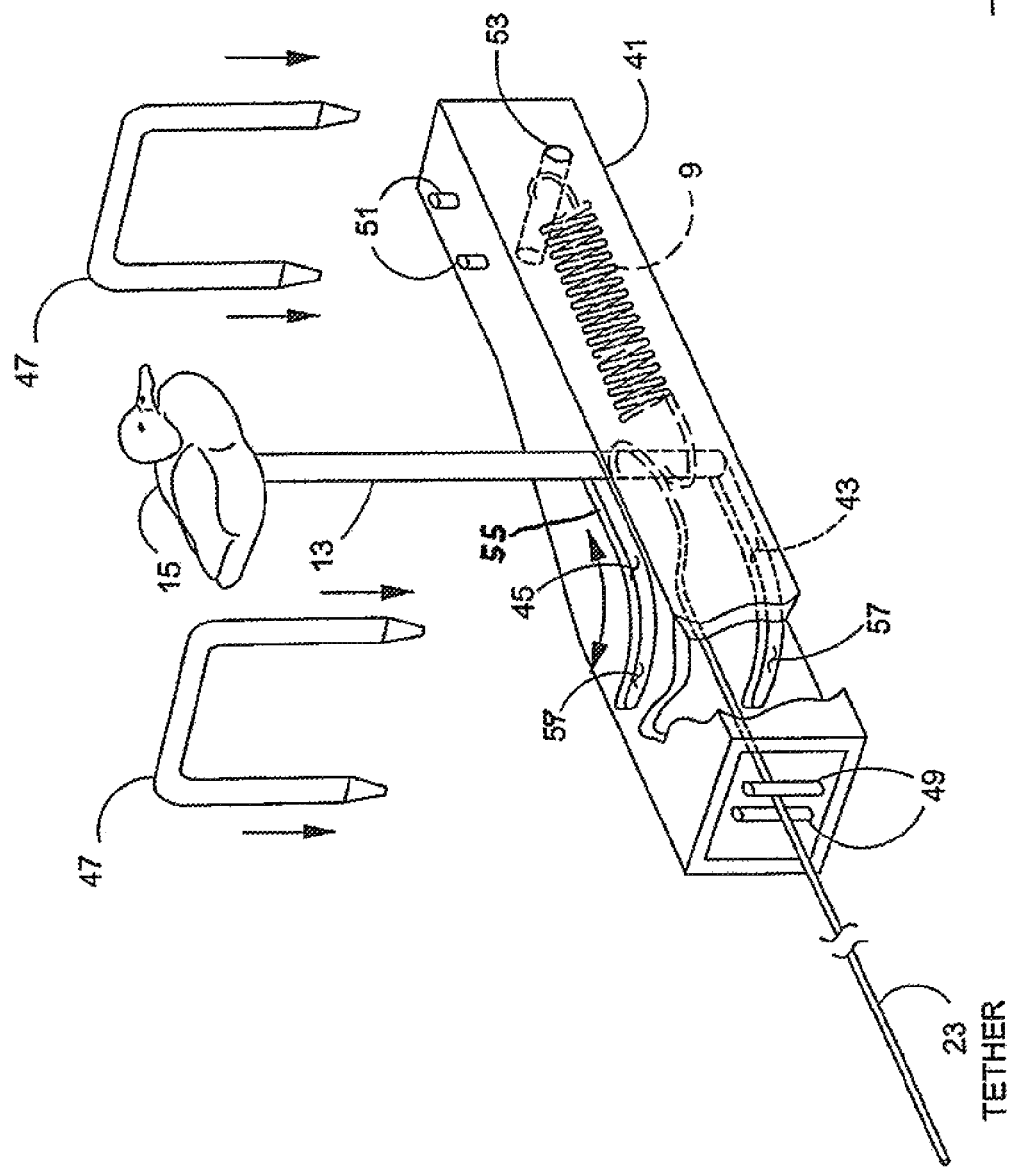
FIG. 4 is an embodiment of the hunting decoy apparatus with an arcuate track.

As shown in FIG. 4, in an alternate embodiment, the hunting decoy apparatus 1 could employ a partially arcuate track slot 55. An arcuate track slot segment 59 would further induce rotation of the decoy 15. In this embodiment, there is one outer member 41 and no sleeve member. The movement of the decoy 15 is controlled directly by the tether 23 moving the decoy stand in the track. The spring 9 or biasing device is attached at its distal end to the inside of the rearward wall of the outer member 41. The proximal end of the spring 9 is attached directly to the decoy stand 13. The decoy stand 13 is inserted into a upper track slot 55, which is a defined void in the top side of outer member 41. The decoy stand 13 is also seated in a lower track segment 43, through 57, on the internal bottom side of the outer member 41. The device may include intermediate track rails between the upper slot and the lower track. The upper track slot 55 is comprised of a fore-aft linear track slot segment 45 (linear with respect to the elongated outer member 41) and an arcuate track slot segment 59. The lower track segment 43, 57 is comprised of a for-aft track linear segment 43 (linear with outer member) and a arcuate tract segment 57. The lower track segments 43, 57 guide the decoy stand 13 and provide additional support for the decoy stand 13 as it is moved within the upper track slot 55. As shown in FIG. 4, linear slot/track segments 45, 43 are vertically aligned. Arcuate slot/track segments 59, 57 are also vertically aligned within the outer member 41.

The tether 23 is attached directly to the decoy stand 13 by any known attachment means. The tether 23 exits the proximal end of the outer member 41 through cylindrical guide posts 49. Element 49 may be a grommet. These cylindrical guide posts 49 may be rollers, movably mounted in aft cover box segment. As shown in FIG. 4, the outer member 41 contains a cut away view to show the lower arcuate track segment 57. The cut away view also shows the tether 23. The hunter holds onto and manipulates the other end of the tether 23.

The embodiment in FIG. 4 may use U-shaped stakes 47 to hold the hunting decoy apparatus 1 in place. Stake position pins 51 are located on the upper surface of the outer member 41 and spaced apart to enable the stake position pins 51 to receive a U-shaped stake 47 and therefore secure the hunting decoy apparatus 1 to the ground when movement of the decoy 13 is activated. The stake position mechanism 51 may be an eyelet through which 47 is retained. A U-shaped stake 47 may also be used to secure the proximal end of the outer member 41 to the ground to prevent any movement of the hunting decoy apparatus 1 when motion is activated. The U-shaped stakes 47 limit fore and aft movement with the stake position pins 51. The U-shaped stakes 47 limit left and right movement of the decoy hunting apparatus 1 which can be cause by the decoy stand 13 moving left and right in the arcuate slot segment 55.

The hunting decoy 15 of the embodiment shown in FIG. 4 moves similarly to the movement shown in the apparatus of FIG. 3 and described above, except the partly arcuate track slot 55 contains an arcuate track slot segment 59. Referring to the embodiment shown in FIG. 4, the tether 23 allows the user of the hunting decoy apparatus 1 to activate the motion of the decoy 15. The user pulls the tether 23 toward himself, which causes the decoy stand 13 and decoy 15 to move along the upper track slot 55, 59 guided by the lower track segments 43, 57 toward the user and in an arc defined by slot/track 59, 57. There is a bit of play or movement that causes the decoy stand 13 to sway fore and aft with light pulls of the tether 23 from the user. This sway or wobble can cause the decoy 15 to appear to be bobbing and pecking as birds do. This sway or wobble is also enhanced by the user releasing the tether 23, causing the spring 9 to draw the decoy stand back into its original position within the outer sleeve member 3. This slight tugging motion causes the decoy 15 to appear to have lifelike movements. This sway or wobble, further enhanced by the curve of the track further, causes the decoy 15 to bob and peck in a realistic fashion.

The claims appended hereto are meant to cover modifications and changes within the scope and spirit of the present invention.

What is claimed is:

1. A hunting decoy apparatus with lifelike movements comprising:
    an outer member having a top surface and an internal bottom side and an inside rearward wall, said outer member having opposing ends between which a longitudinal axis of said outer member extends;
    a decoy of an animal that is attached to an end of a decoy stand;
    a biasing member connected at a distal end thereof to said inside rearward wall of said outer member and connected at a proximal end thereof to said decoy stand;
    an upper track slot in said top surface of said outer member for receiving said decoy stand, wherein said upper track slot comprises a continuous curvilinear arcuate upper track slot segment and a substantially linear upper track slot segment;
    a lower track on said internal bottom side of said outer member, wherein said lower track comprises a continuous curvilinear lower track segment and a substantially linear lower track segment;
    said continuous curvilinear arcuate upper track slot segment being both (a) vertically aligned with said curvilinear lower track segment and (b) having a same continuous curvilinear shape and size as said curvilinear lower track segment, and wherein said decoy stand rests on said bottom interior surface of said outer member, is guided by said lower track, and extends perpendicular from said outer member in an upward direction, said continuous curvilinear arcuate upper track slot segment and continuous curvilinear lower track segment each having a length which extends transversely to said longitudinal axis of said outer member;
    a tether attachable to said decoy stand and extending out of said outer member toward a user;
    wherein to activate movement of said decoy, said tether is pulled and released by said user causing said decoy stand to linearly move within said upper track slot and said lower track forward and backwards, whereby small tugs on said tether by said user causes said decoy to move in lifelike movements creating an appearance said decoy is bobbing and pecking like a wild bird; and
    wherein said upper track slot and said lower track, into which said decoy stand is inserted, allows for said decoy and said decoy stand to wobble along a curvilinear path defined by said curvilinear arcuate upper track slot segment and said curvilinear lower track segment, creating additional lifelike movements of said decoy due to a release of tension on said tether and a biasing member retraction causing said decoy and said decoy stand to rock and wobble within said upper track slot and said lower track forward and backwards and arcuately.

2. The hunting decoy apparatus of claim 1, further including a friction reducing guide for a tether passageway on a proximal outside surface of said outer member at an exit of said tether from said outer member.

3. The hunting decoy apparatus of claim 1, further including U-shaped stakes to be placed around said outer member and inserted into ground to secure said hunting decoy apparatus to the ground and prevent it from moving.

4. The hunting decoy apparatus of claim 1, further including stake positioning pins for receiving a U-shaped stake which limit a fore and aft movement of the hunting decoy apparatus when movement of said decoy is activated.

\* \* \* \* \*